United States Patent
Hahn et al.

(10) Patent No.: US 11,472,067 B2
(45) Date of Patent: Oct. 18, 2022

(54) METHOD AND APPARATUS FOR MANUFACTURING A WIND TURBINE BLADE BODY

(71) Applicant: Vestas Wind Systems A/S, Aarhus (DK)

(72) Inventors: Frank Hoelgaard Hahn, Ingkøbing (DK); Vijayasankar Irissappane, Ringkøbing (DK)

(73) Assignee: Vestas Wind Systems A/S, Aarhus N (DK)

( * ) Notice: Subject to any disclaimer, the term of this patent is extended or adjusted under 35 U.S.C. 154(b) by 567 days.

(21) Appl. No.: 15/777,266

(22) PCT Filed: Nov. 22, 2016

(86) PCT No.: PCT/DK2016/050384
§ 371 (c)(1),
(2) Date: May 18, 2018

(87) PCT Pub. No.: WO2017/088883
PCT Pub. Date: Jun. 1, 2017

(65) Prior Publication Data
US 2018/0339431 A1    Nov. 29, 2018

(30) Foreign Application Priority Data

Nov. 25, 2015 (DK) .............................. PA2015 70761

(51) Int. Cl.
*B29C 33/30* (2006.01)
*B29D 99/00* (2010.01)
(Continued)

(52) U.S. Cl.
CPC ........ *B29C 33/306* (2013.01); *B29D 99/0028* (2013.01); *B29L 2031/085* (2013.01); *F03D 1/0675* (2013.01); *Y02P 70/50* (2015.11)

(58) Field of Classification Search
CPC ..... B29C 33/30; B29C 33/306; B29C 70/443; B29C 65/40; B29C 33/12; B29C 33/38;
(Continued)

(56) References Cited

U.S. PATENT DOCUMENTS 7,972,129 B2 *  7/2011  O'Donoghue .......... B29C 33/40
                                              425/388
9,033,283 B1 *  5/2015  Hemmelgarn ............ B64C 3/48
                                              244/219
(Continued)

FOREIGN PATENT DOCUMENTS

CN        201685370 U      12/2010
CN        102873519 A       1/2013
(Continued)

OTHER PUBLICATIONS

Danish Patent and Trademark Office, Search and Examination Report in PA 2015 70761, dated Jun. 23, 2016.
(Continued)

*Primary Examiner* — Matthew J Daniels
*Assistant Examiner* — Shibin Liang
(74) *Attorney, Agent, or Firm* — Wood Herron & Evans LLP

(57) ABSTRACT

A method of manufacturing a wind turbine blade body, the method comprising the steps of: providing a mould (40) having a mould surface (43) for forming a first blade body having a first length, the mould having a mould root end and a mould tip end (42); placing a removable insert (50) on the mould surface towards the mould tip end to form a modified mould surface for forming a second blade body having a second length which is less than the first length; and forming the second blade body on the modified mould surface.

16 Claims, 12 Drawing Sheets

(51) Int. Cl.
*B29L 31/08* (2006.01)
*F03D 1/06* (2006.01)

(58) Field of Classification Search
CPC .. B29D 99/00; B29D 99/0028; B29L 203/085
See application file for complete search history.

(56) References Cited

U.S. PATENT DOCUMENTS

| | | | |
|---|---|---|---|
| 2007/0063378 | A1 | 3/2007 | O'Donoghue |
| 2013/0328241 | A1* | 12/2013 | Obrecht ............... B29C 33/308 264/299 |
| 2014/0369849 | A1 | 12/2014 | Flach |

FOREIGN PATENT DOCUMENTS

| | | | |
|---|---|---|---|
| DE | 102012223810 A1 | 6/2014 | |
| EP | 2316629 A1 | 5/2011 | |
| WO | WO 2014095865 * | 12/2012 | ............. B29C 33/30 |
| WO | 2014095856 A2 | 6/2014 | |
| WO | 2014095865 A1 | 6/2014 | |
| WO | 2015004257 A1 | 1/2015 | |
| WO | 2015067637 A1 | 5/2015 | |

OTHER PUBLICATIONS

European Patent Office, International Search Report and Written Opinion in PCT Application Serial No. PCT/DK2016/050384, dated Feb. 2, 2017.
China National Intellectual Property Administration, First Notification of Office Action in CN Application No. 201680079861.0, dated Oct. 21, 2019.
China National Intellectual Property Administration, Decision of Rejection in CN Application No. 201680079861.0, dated May 8, 2021.
Intellectual Property of India, Examination Report in IN Application No. 201817020183, dated Jan. 25, 2021.
Chun Li et al., Design Principle of Modern Large-scale Wind Turbine, Shanghai Science and Technology Press, Jan. 2013, pp. 166-167.

* cited by examiner

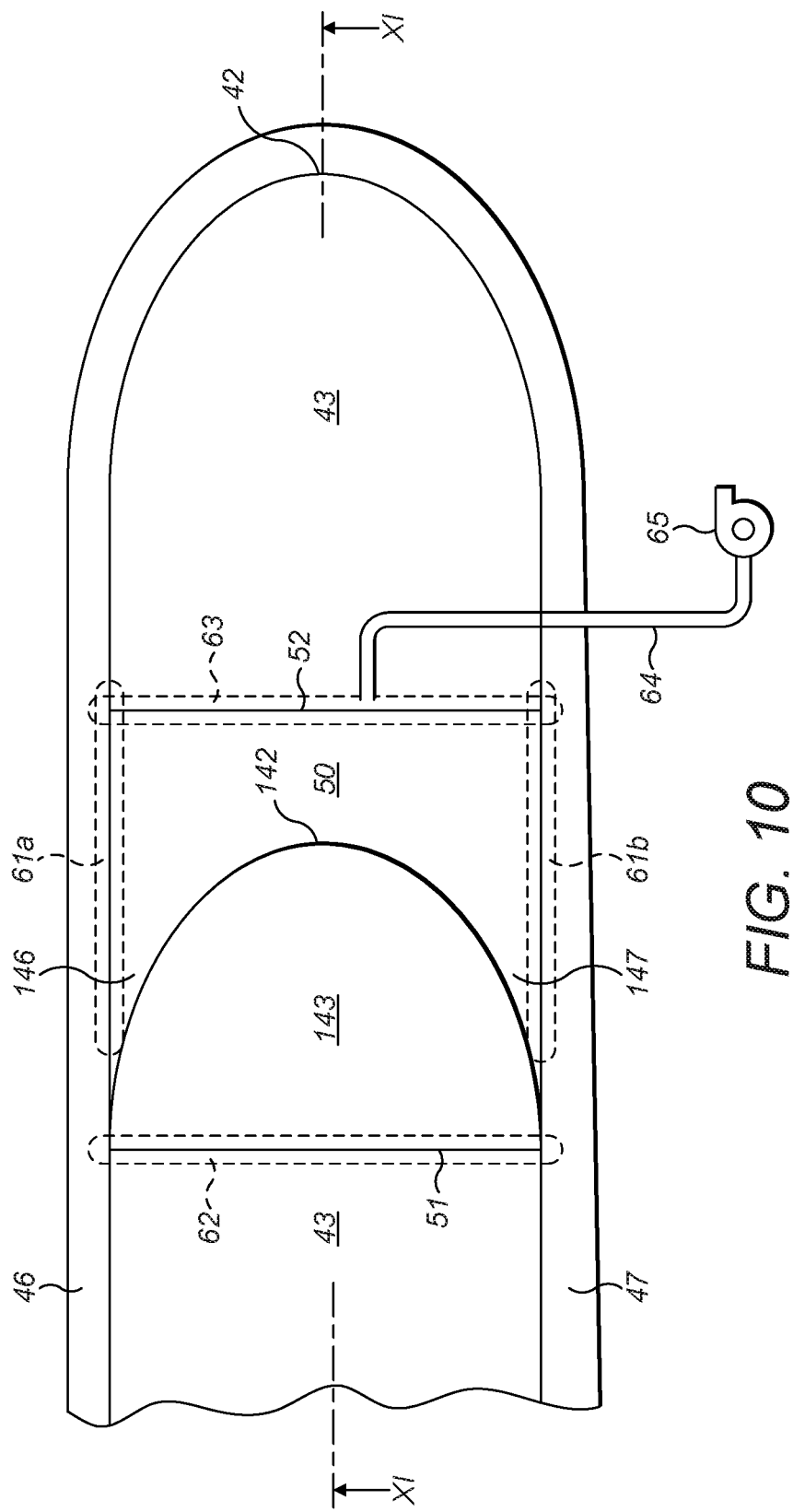

METHOD AND APPARATUS FOR MANUFACTURING A WIND TURBINE BLADE BODY

The present invention relates to a method and apparatus for manufacturing a wind turbine blade body. In particular, the present invention relates to a method and apparatus for forming a wind turbine blade in a mould, the blade having a length that is shorter than existing blades produced from the same mould.

BACKGROUND

Modern wind turbine blades typically comprise a blade shell having a laminate structure of composite construction. The shell is commonly manufactured using a prepreg or vacuum-assisted resin infusion process in a female mould. Wind turbine blades are of considerable length, at present up to 80 meters in length and the moulds in which the blades are formed have a substantial cost. At present, if it is desired to manufacture a new length of rotor blade then a new mould has to be manufactured with significant cost. The present invention aims to provide a method and apparatus so that different lengths of wind turbine blades can be manufactured with lower mould costs.

SUMMARY

According to a first aspect of the present invention there is provided a method of manufacturing a wind turbine blade body, the method comprising the steps of: providing a mould having a mould surface for forming a first blade body having a first length, the mould having a mould root end and a mould tip end. Placing a removable insert on the mould surface towards the mould tip end to form a modified mould surface for forming a second blade body having a second length which is less than the first length. Forming the second blade body on the modified mould surface.

The method may further comprises the steps of selecting the length of the second blade body based on the blade length required; and selecting a removable insert which is sized to form a second blade body having the required length.

Preferably, the blade body comprises a wind turbine blade shell or half shell and extends from a root end to a tip end.

Preferably a gap is provided between the insert and the mould surface. A vacuum may be applied between the insert and the mould to retain the insert in position on the mould surface. Preferably, the vacuum is applied to the gap between the insert and the mould surface.

Preferably, the insert extends over a side surface of the mould and is clamped to the mould. The side surface of the mould may have a negative draft angle.

The insert may extend between a proximal end facing toward the mould root end and a distal end facing toward the mould tip end, and wherein: the mould tip end has a spanwise position R1; the insert when located on the mould has an insert tip end at a spanwise position R2 and the proximal end is at a spanwise position R3.

The step of placing the insert on the mould surface may comprise locating the distal end of the insert at a distance from the mould tip end.

Preferably, a twist distribution of the modified mould surface of the insert between the positions R2 and R3 is different to the twist distribution of the mould surface of the mould between the positions R2 and R3.

According to a second aspect of the present invention there is provided an apparatus for manufacturing a wind turbine blade body comprising: a mould having a mould surface for forming a first blade body having a first length, the mould having a mould root end and a mould tip end; a removable insert arranged to be placed on the mould surface towards the mould tip end to form a modified mould surface for forming a second blade body having a second length which is less than the first length. Preferably, the insert is formed with a rib structure.

Features of the first aspect of the invention as set out above also apply to the second aspect of the invention.

BRIEF DESCRIPTION OF THE DRAWINGS

Examples of the invention will now be described in detail with reference to the following figures, in which:

FIG. 10 is a plan view of the wind turbine rotor blade mould with the insert in the mould.

DETAILED DESCRIPTION OF THE INVENTION

Figure 1:
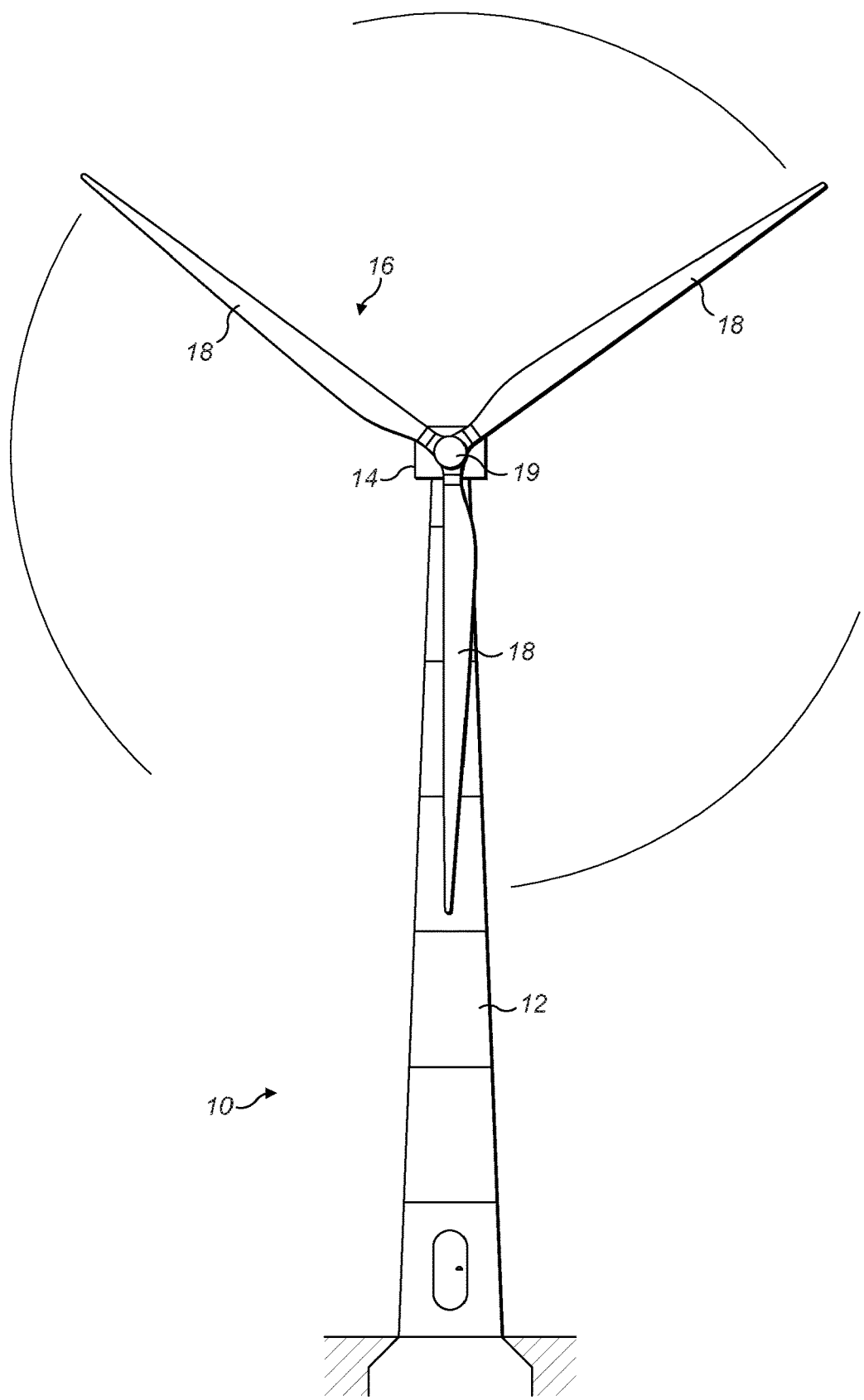
FIG. 1 is a view of a wind turbine.

FIG. 1 shows a wind turbine 10. The wind turbine 10 comprises a tower 12 supporting a nacelle 14 to which a rotor 16 is mounted. The rotor 16 comprises a plurality of wind turbine blades 18 that extend radially from a central hub 19. In this example, the rotor 16 comprises three blades 18.

Figure 2:
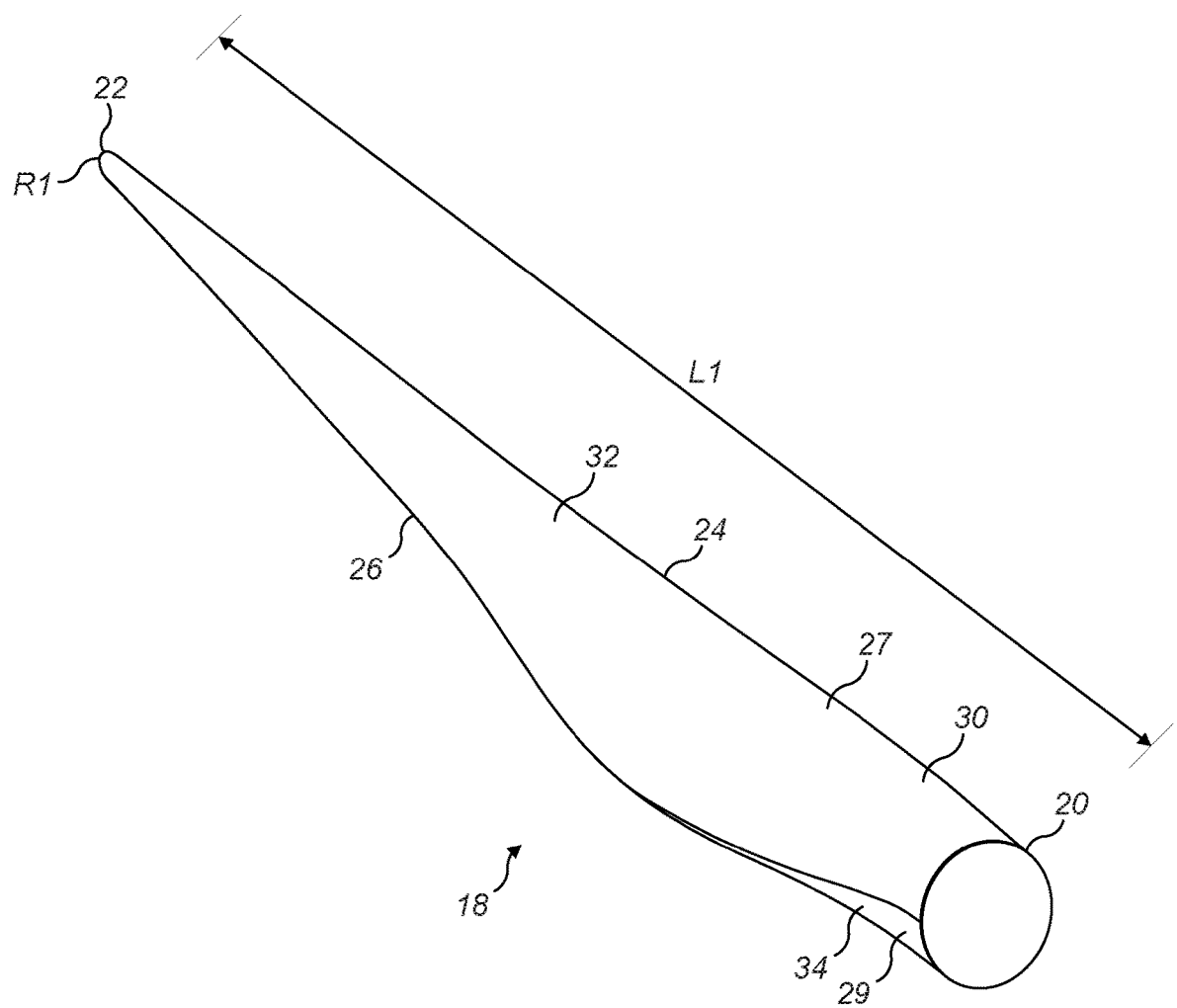
FIG. 2 is a view of a wind turbine rotor blade.

FIG. 2 is a view of one of the blades 18 of the wind turbine 10. The blade 18 extends from a generally circular root end 20 to a tip end 22 in a longitudinal 'spanwise' direction, and between a leading edge 24 and a trailing edge 26 in a transverse 'chordwise' direction. The blade 18 comprises a shell 27 formed primarily of fibre-reinforced plastic (FRP). The shell 27 comprises a pressure surface 29 on a pressure side of the blade 18 and a suction surface 30 on a suction side of the blade 18. The blade has a length L1 in the spanwise direction extending from the root end 20 to the tip end 22. Spanwise positions on the blade can also be expressed in terms of a radius as measured from the rotational axis of the hub 19. In FIG. 2, the tip 22 is expressed as radius "R1".

The blade 18 transitions from a circular profile to an airfoil profile moving from the root end 20 of the blade 18 towards a shoulder of the blade 18, which is the widest part of the blade 18 where the blade 18 has its maximum chord. The blade 18 has an airfoil profile of progressively decreasing thickness in an outboard portion of the blade 18, which extends from the shoulder 30 to the tip 22 of the blade 18.

The shell 27 of the blade is fabricated from first and second half shells 32, 34 which are adhesively joined together along the leading edge 24 and the trailing edge 26. The half shells 32, 34 are laminated structures that are moulded from fibre reinforced plastic (FRP) including glass fibres and possibly carbon fibres.

The half shells 32, 34 are moulded in separate mould halves. Once each half shell 32, 34 has been moulded, the two half shells 32, 34 are brought together by bringing the two mould halves together, and the half shells 32, 34 are bonded together to form the complete blade 18.

Figure 3:
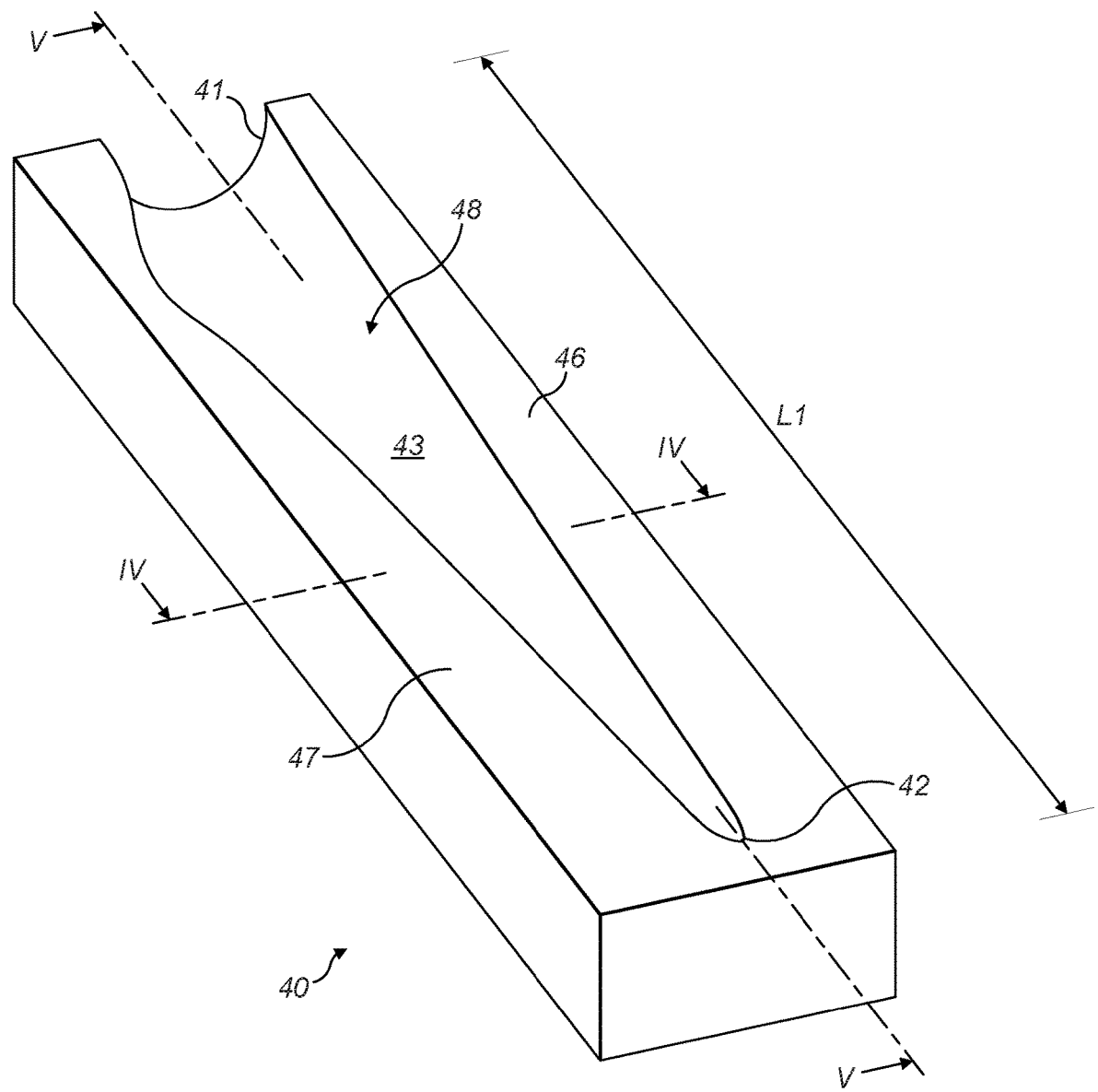
FIG. 3 is a view of a wind turbine rotor blade mould.

FIG. 3 shows a mould half 40 for forming one of the half shells 32, 34. The mould half will be referred to hereafter for convenience as the mould. The mould 40 comprises a mould root end 41 and a mould tip end 42. The half shell is formed on a mould surface 43 having a shape corresponding to the shape of the half shell 44 to be formed.

To form a half shell, one or more layers of glass-fibre fabric are placed on the mould surface 43 of the mould 40. These layers will later form an outer skin of the blade 18. Structural elements, including spar caps and sandwich core panels are then arranged on top of the outer fabric layers. One or more further layers of dry glass-fibre fabric are then placed over the structural elements, and will later form an inner skin of the blade.

The mould 40 has a leading flange 46 and a trailing edge flange 47 which extend from the mould root end 41 to the mould tip end 42. The mould 40 has a recess 48 which is formed between the mould flanges 46, 47 and the mould surface 43.

Figure 4:
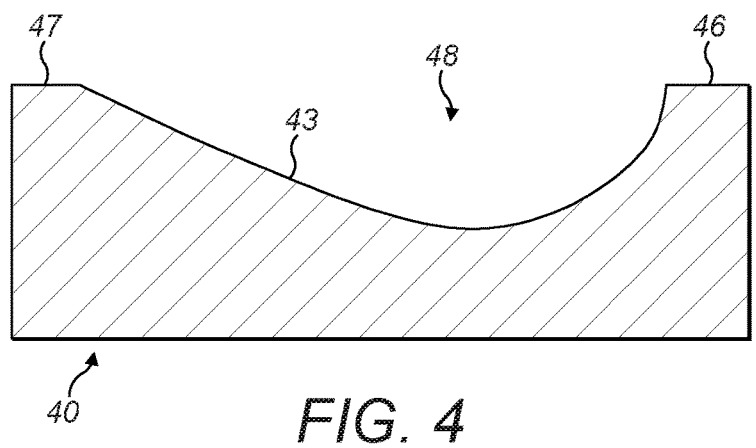
FIG. 4 is a cross section of the wind turbine rotor blade mould along the line IV-IV of FIG. 3.
Figure 5:
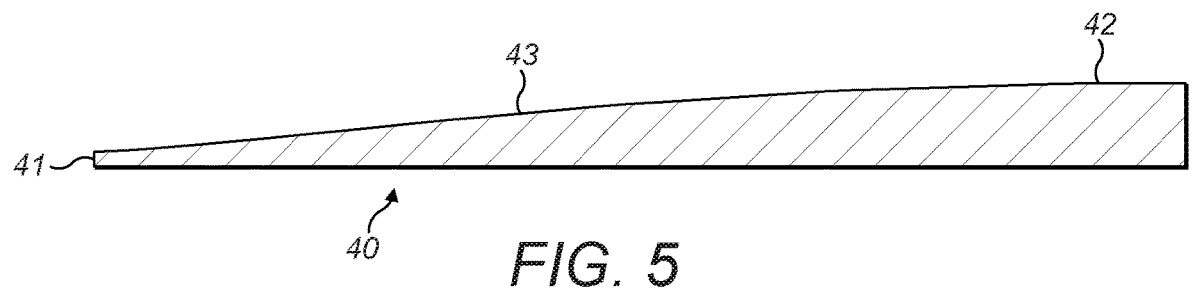
FIG. 5 is a cross section of the wind turbine rotor blade mould along the line V-V of FIG. 3.

FIGS. 4 and 5 are cross-sectional views along the lines IV-IV and V-V in FIG. 3, respectively.

Figure 6:
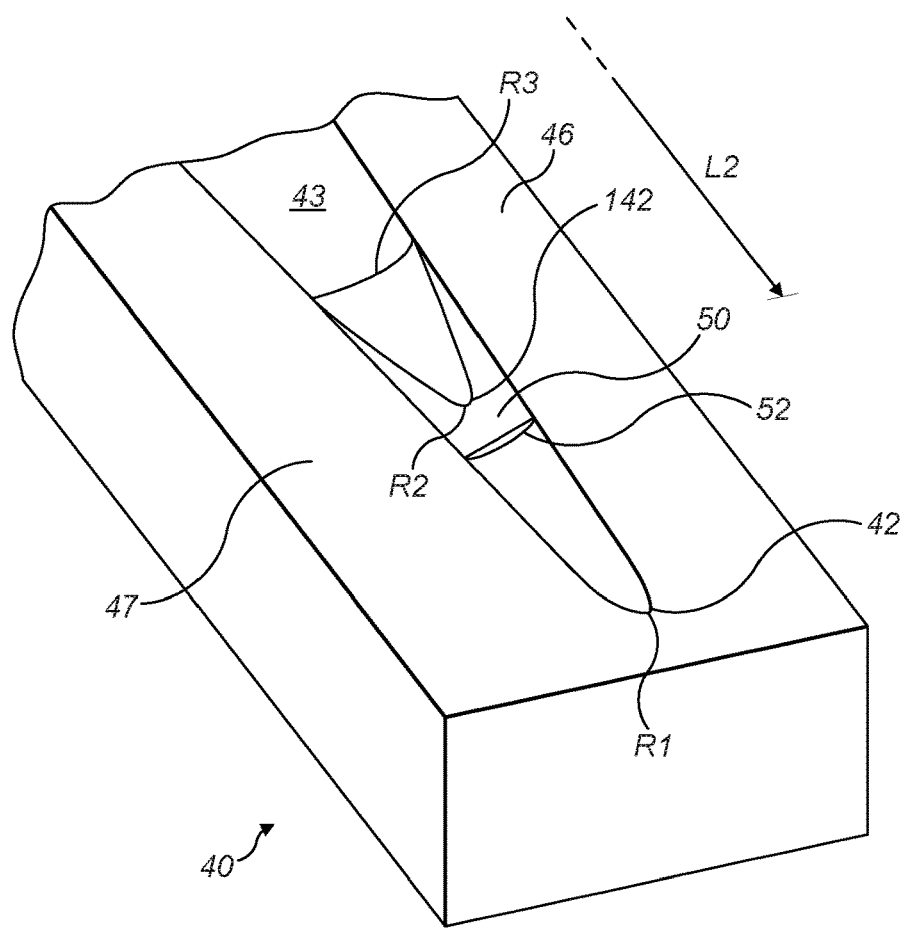
FIG. 6 is a partial view of a wind turbine rotor blade mould with an insert in the mould.

FIG. 6 shows a partial view of the mould 40 where an insert 50 has been located in the mould recess 48 near to the mould tip end 42. The inert 50 is a part which shortens the length of the mould 40. In particular, the insert modifies the mould surface 43 such that there is a modified mould tip end 142. Referring to FIG. 3, the mould has a length L1 defined between the mould root end 41 and the mould tip end 42. In FIG. 6, the length of the modified mould is L2 defined between the mould root end and the modified mould tip end 142. The length L1 of the mould is the same length as that of the blade 18 shown in FIG. 2.

The insert forms a modified mould surface such that a blade shell produced with the insert 50 in place in the mould 40 will have a shorter length than when the insert 50 is not in place.

The mould tip end 42 corresponds to the radius R1, that is the spanwise position of the tip end 22 of the blade 18. The insert 50 starts at a spanwise position R3 and extends to the modified tip end 142 which is at a spanwise position R2.

Figure 7A:
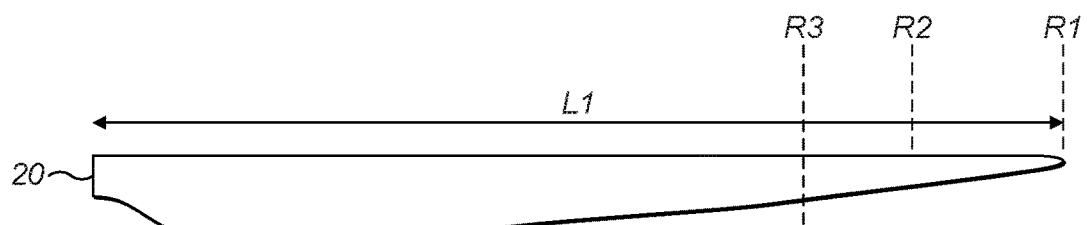
FIGS. 7a and 7b are plan views of blades produced from the blade mould.

Referring to FIG. 7a which shows a plan view of a blade, a blade formed in the mould 40 without the insert 50 has the length L1 and the tip end is at the spanwise position R1—this blade is designated herein as the first blade, B1.

Figure 7B:
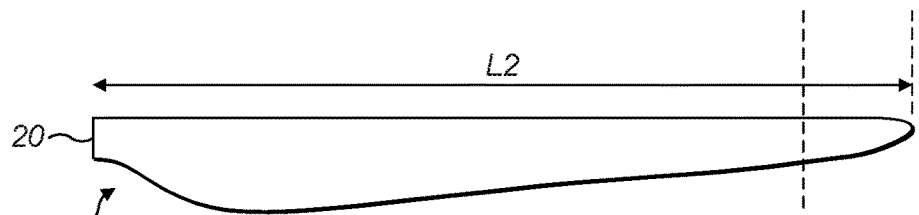

Referring to FIG. 7b, a blade formed in the mould 40 with the insert 50 has the length L2 and the tip end is at the spanwise position R2—this blade is designated herein as the second blade, B2. The second blade B2 has a shorter spanwise length that the first blade B1 due to the insert 50 being used in the mould 40. As seen in FIG. 6, the insert 50 starts at spanwise position R3. Therefore, between the blade root end 20 and the spanwise position R3, the blades B1 and B2 have an identical geometry—that is their aerodynamic surface is identical as they have been formed on the same mould surface 43.

Although the blades B1 and B2 have an identical aerodynamic surface between the root end 20 and the spanwise position R3, the internal structure of the blades can vary between the root end and R3. For example, as the second blade B2 has a shorter length it may be subjected to less loads in use (compared to the first blade B1) such that it does not require the same amount of structural material.

Figure 8:
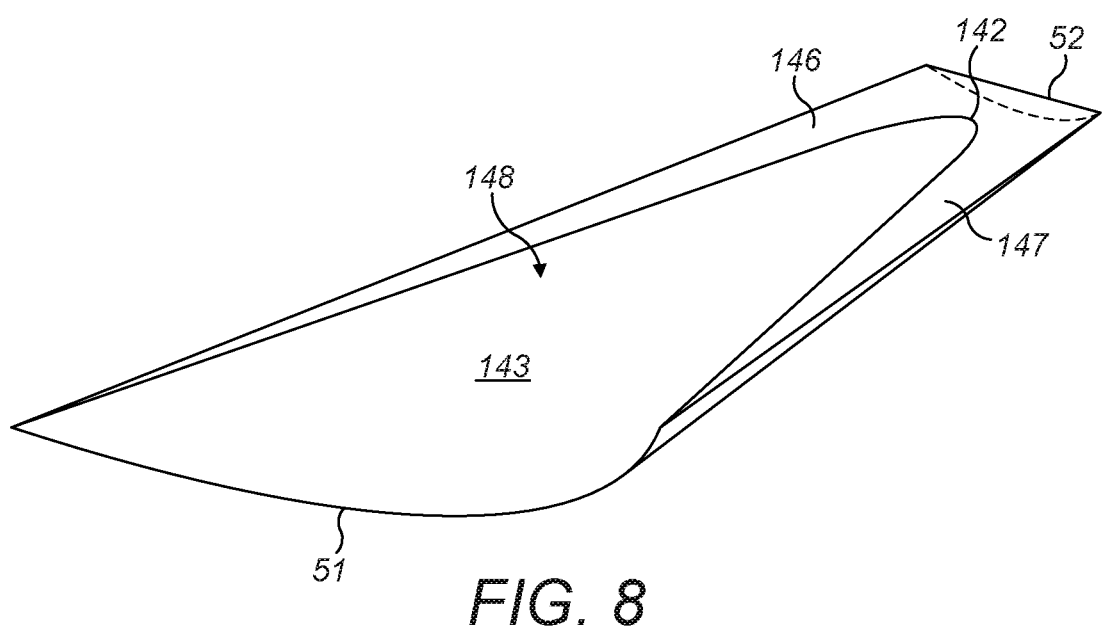
FIG. 8 is a view of the insert.

FIG. 8 shows a perspective view of the insert 50. The insert 50 comprises a proximal end 51 which faces toward the mould root end 41 and a distal end 52 which faces towards the mould tip end 42. An insert leading edge flange 146 and an insert trailing edge flange 147 extend from the proximal end 51 to the distal end 52. The insert 50 has an insert mould surface 143 and an insert mould recess 148. The modified mould tip end 142 corresponds to the tip end of the insert, that is 'the insert tip end'.

As can be seen in FIG. 6, the insert 50 is positioned in the mould 40 such that there is a distance between the distal end 52 of the insert and the mould tip end 42. In other examples, the distal end of the insert could be sized so that it is positioned at the mould tip end 42.

In this example, the insert 50 is removable and is placed toward the mould tip end 42 to form a modified mould surface 143. The removable insert 50 is shaped to form the tip end of a blade half shell made in the tool 40. The wind turbine blade half is then manufactured in the tool 40 in a conventional manner. Due to the presence of the removable tool insert 50 on the mould 40, the resulting blade half shell has a reduced length of L2, rather than a length of L1.

The proximal end 51 of the insert 50 is configured so that it smoothly blends into the mould surface 43 of the mould 40. In other words, a step change in the geometry is avoided between the mould surface 43 and the modified mould surface 143.

The other half shell of the wind turbine blade is formed in a second mould (not shown) in the same manner as described above in respect of the mould 40. The two blade halves are then assembled to form the wind turbine blade.

Following removal of the blade half shell from the mould 40, the insert 50 can be left in the mould 40 in order to manufacture further blade half shells having the same length L2.

Alternatively, the insert 50 can be removed from the mould 40 so that a blade half shell having a length L1 can be formed in the unmodified mould. Or the insert may be replaced with one or more alternative removable inserts (not shown) having different sizes for forming a variety of blade lengths.

With this method, a number of blade variants having different, but similar, blade lengths can be formed in the same mould. For example, if L1 is 60 metres, removable inserts can be used to produce blade variants having shorter lengths, e.g. 56 metres, 55 metres and 54 metres etc. For example, variations in blade length of from anywhere between about 0.1% to about 20% can be provided, although preferably the variation in length is in the region of from about 1% to about 10%, more preferably from about 3% to about 7%.

Figure 9:
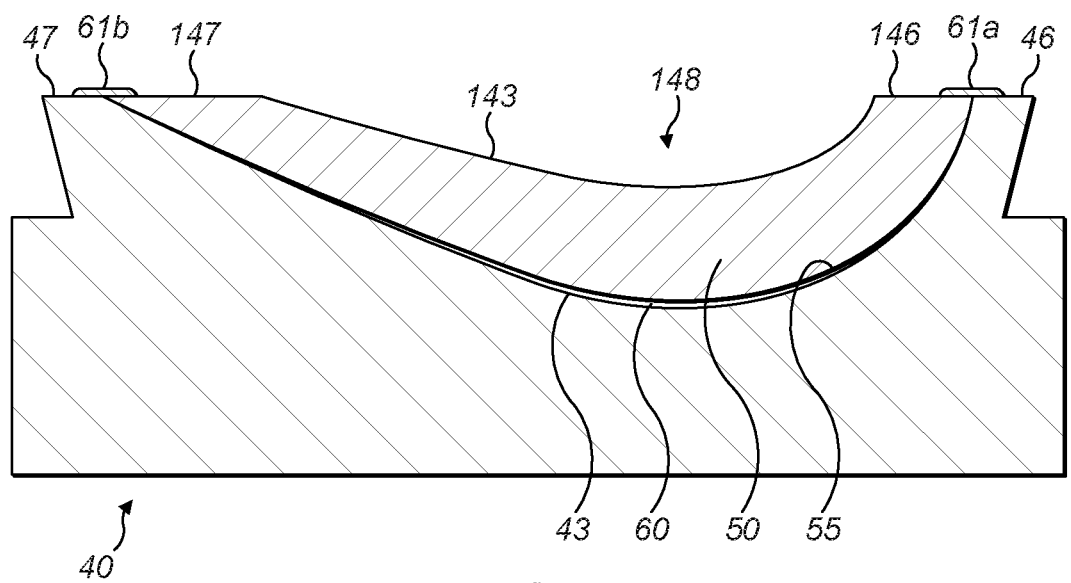
FIG. 9 is a cross section of the wind turbine rotor blade mould with the insert in the mould.

FIGS. 9 and 10 show how the insert 50 is held to the mould 40, which in this example is via a vacuum. FIG. 9 is a cross-sectional view through the mould 40 and the insert 50, and FIG. 10 is a plan view. The insert 50 is placed in the mould 40 such that the insert leading edge flange 146 is aligned with the mould leading edge flange 46, and the insert trailing edge flange 147 is aligned with the mould trailing edge flange 47. As can be seen in FIG. 9, there is a gap 60 between the mould surface 43 and the underside 55 of the insert 50. This gap has a height of the order of 0.1 mm. The gap 60 allows an under pressure to be created between the insert 50 and the mould 40 so that the insert is retained in a fixed position against the mould. It will be appreciated that the gap 60 is shown enlarged in the Figures for clarity.

A seal is provided between the mould 40 and the insert 50. Referring to FIG. 10, the following seals are provided:

(i) a seal 61a over the joint between the insert leading edge flange 146 and the mould leading edge flange 46. This seal can be a Teflon tape.

(ii) a seal 61b over the joint between the insert trailing edge flange 147 and the mould leading edge flange 47. This seal can be a Teflon tape.

(iii) a seal 62 over the joint between the mould surface 43 and the insert mould surface 143 at the proximal end 51 of the insert 50. This seal can be a Teflon tape.

(iv) a seal 63 over the joint between the insert 50 and the mould surface 43 at the distal end 52 of the insert 50. This seal 63 can be formed from a vacuum film with sealant tape around its periphery.

After the seals have been provided around the insert 50, a vacuum line 64 is attached and passes through the vacuum film of seal 63. A vacuum pump 65 then evacuates the air under the seal 63 which will also evacuate the air from the gap 60. Compared to the ambient air pressure, the pressure in the gap 60 will be at a relatively lower pressure such that the insert 50 is 'sucked' down onto the mould 40.

As the insert 50 is retained on the mould 40 through a vacuum, no modifications need to be made to the mould 40. In other words, it is not necessary to bolt or screw the insert to the mould, for example. As the mould 40 is not modified in anyway, the insert 50 can simply be released by turning off the vacuum pump 65 and the mould can then be used to make blades with the original length L1 without any damage having been made to the mould 40.

FIGS. 11a to 11d are schematic cross-section views along the line XI-XI of FIG. 10. FIGS. 11a to 11d illustrate the steps taken to manufacture the wind turbine blade shell in the mould 40 with the insert 50.

Figure 11A:
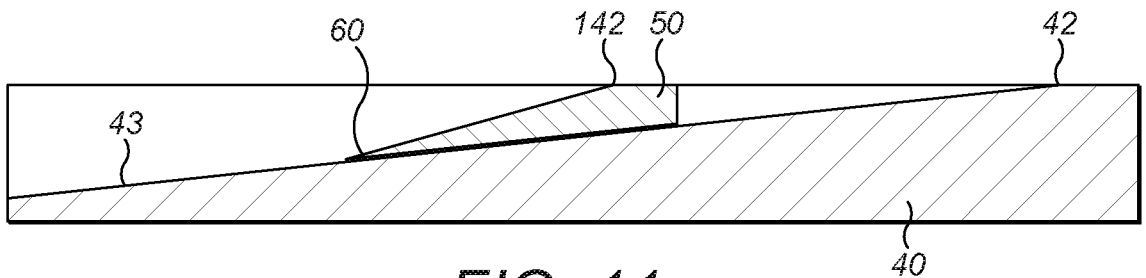
FIGS. 11a to 11d are cross section views of the wind turbine rotor blade mould (along the line XI-XI of FIG. 10) with the insert in the mould showing how the blade is fabricated.

FIG. 11a shows the insert 50 placed in the mould 40. As can be seen there is the gap 60 between the mould surface 43 and the underside of the insert 50.

Figure 11B:
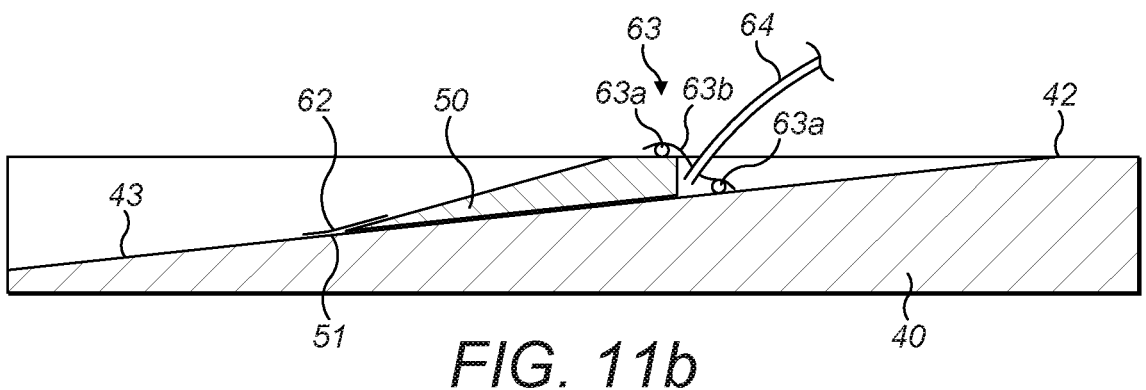

Next, as shown in FIG. 11b, the insert 50 is sealed against the mould 40 so that it is retained firmly in position. A seal 62 is provided between the proximal end 51 of the insert and the mould surface 43 as discussed above. The seal 63 at the distal end of the insert comprises strips of sealing tape 63a (for example butyl rubber) and a vacuum film 63b which provides an effective seal. Also shown in FIG. 11b is the vacuum line 64. The cavity under the vacuum film 63b is evacuated which as discussed above will force the insert 50 against the mould 40 and hold it tightly in position.

Figure 11C:
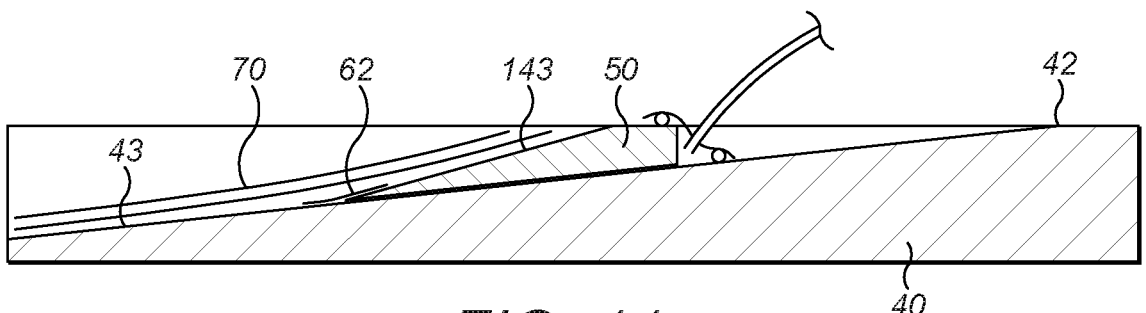

FIG. 11c shows the blade materials being laid into the mould, onto the mould surface 43 and the insert mould surface 143. In this example, the blade materials 70 comprise layers of pre-preg glass fibres (that is glass fabric sheets impregnated with polymer resin) and optionally sandwich core panels.

Figure 11D:
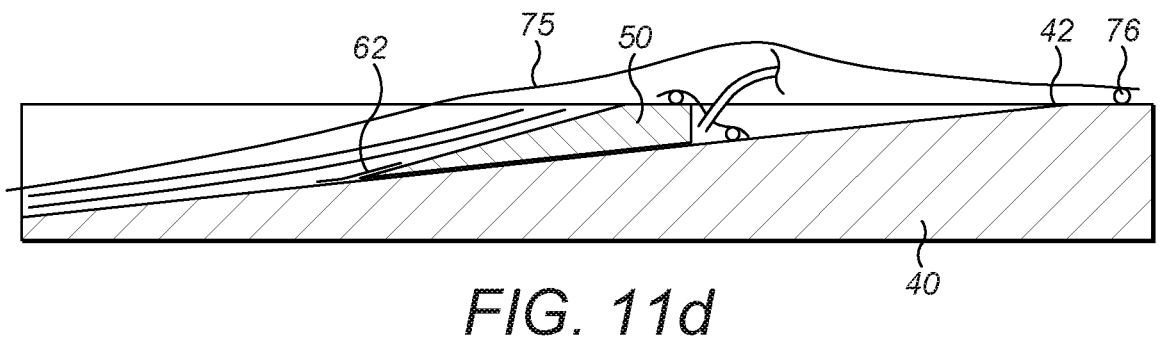

In FIG. 11d the blade materials 70 are covered with a vacuum film 75 and the cavity under the vacuum film 75 is evacuated in order to consolidate the blade materials as is conventional in a composite fabrication operation. The vacuum film 75 is sealed around the periphery of the mould with sealant tape 76. Then the mould is heated in order to cure the blade materials 70.

The vacuum line 64 which is used to retain the insert 50 in position on the mould 40 can pass between the vacuum film 75 and the periphery of the mould 40. When air is evacuated from under the vacuum film 75 the vacuum film 75 will hold the insert 50 against the mould and it is not necessary to keep the vacuum pump 65 running.

Figure 12A:
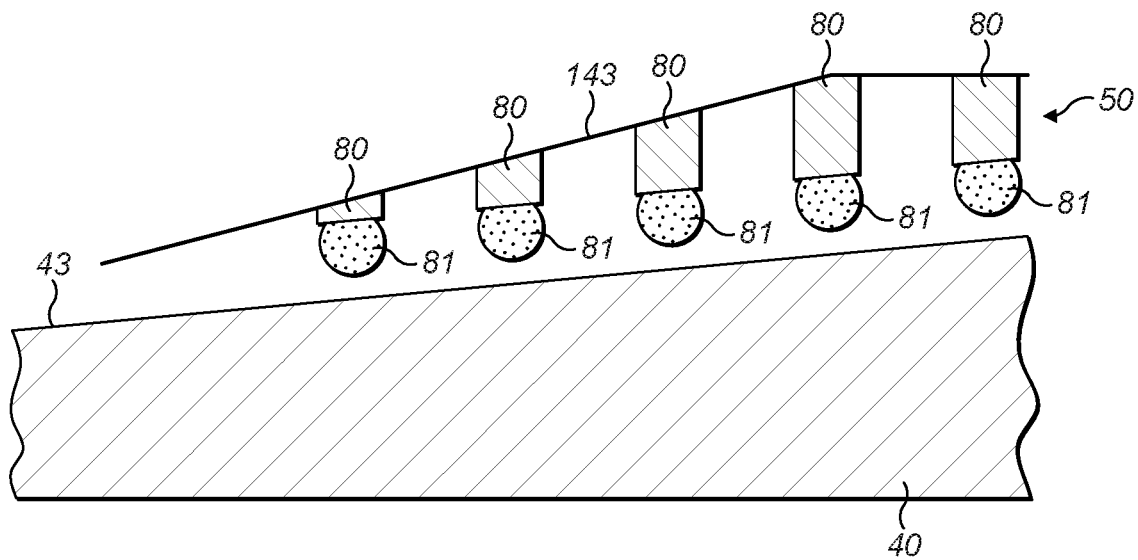
FIGS. 12a and 12b are cross section views of the wind turbine rotor blade mould showing how the insert is positioned on the mould.
Figure 12B:
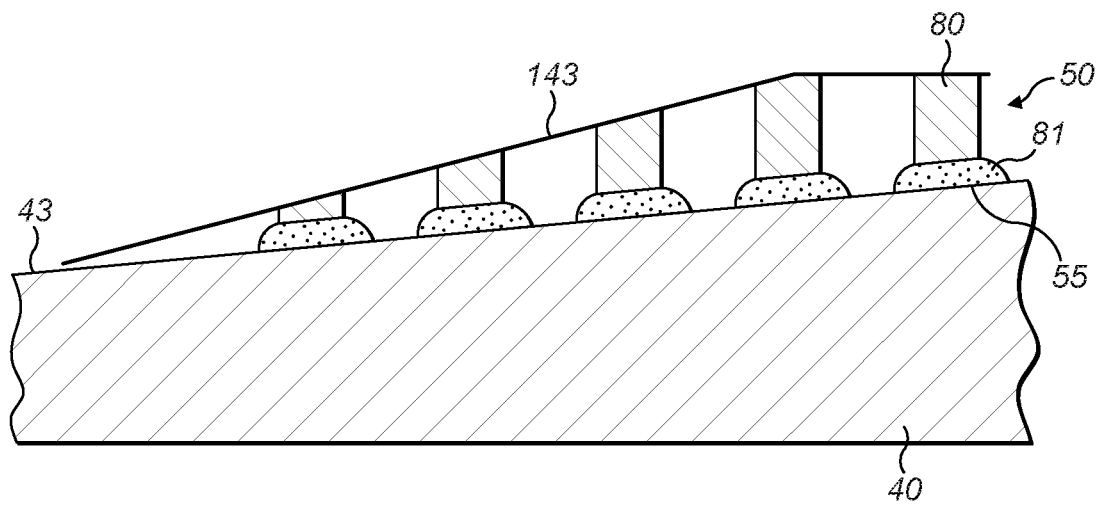

FIGS. 12a and 12b show schematically how the insert 50 can be manufactured such that it has an accurate fit with the mould surface 43 of the mould 40. In this example, the insert mould surface 143 is formed from glass fibre reinforced plastic (GFRP). Extending from an underside of the insert mould surface are a plurality of ribs 80 formed from core material. In this example, the ribs are formed from PET foam but other structural core materials could be used. In other words, the ribs extend from the insert mould surface 143 toward the mould surface 43. The ribs 80 are fabricated such that they do not extend all the way to the mould surface 43. At the end of each rib 80, opposite the insert mould surface 143 there is a bead of uncured adhesive 81, e.g. epoxy or PUR adhesive. The mould surface 43 of the mould 40 has been treated with a release agent. As shown in FIG. 12a, the insert 50 is first held above the mould surface 43 of the mould 40 and then it is lowered such that the adhesive beads 81 make contact with the mould surface 43 shown in FIG. 12b. This compresses and deforms the adhesive beads 81 to the shape of the mould surface 43.

The insert 50 is held in the correct place on the mould 40 via clamps or the use of a jig. While the insert 50 is being held, the adhesive beads 81 will cure and thus this will provide an accurate matching shape between the insert 50 and the mould surface 43. Thus, the bottom of the adhesive beads 81 become the underside 55 of the insert.

As the mould surface 43 has been treated with a release agent, once the adhesive beads 81 have cured, the insert can be lifted from the mould 40 ready for use in a blade manufacturing process. As all moulds 40 can be slightly different due to manufacturing tolerances, it is desirable to produce a bespoke insert 50 for each mould, and the use of the adhesive beads 81 provides a quick and simple solution to create an accurate alignment between the mould and the insert 50. To provide the gap 60 which allows the insert 50 to be held to the mould 40 by vacuum, grooves can simply be scored in the cured adhesive beads 81.

By forming the insert 50 with a rib structure it is relatively lightweight. This enables a fast heat up of the insert 50 when the blade composite materials are heated to be cured and so the use of the insert does not slow down the curing process. The insert 50 can also have inbuilt electrical elements so that the insert can have its own heating system for curing the modified tip end of the blade.

The ribs 80 of the insert 50 can be either machined or they can also be formed from a machined plug to have more dimensional stability. They can also be covered with one layer of GFRP to increase their stiffness as required.

Figure 13:
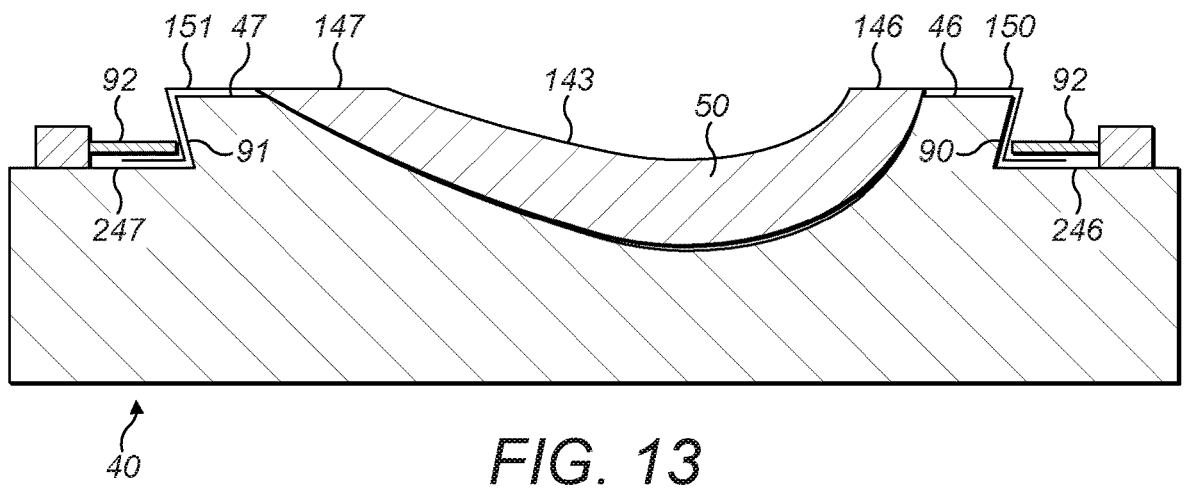
FIG. 13 is a further cross section of the wind turbine rotor blade mould with the insert in the mould.

FIG. 13 shows a more detailed example of how the insert 50 can be secured to the mould 40. The mould 40 comprises a leading flange 46 and a trailing edge flange 47 as described above. Located below these flanges are a leading edge process flange 246 and a trailing edge process flange 247. These process flanges 246, 247 are connected to the mould flanges 46, 47 via side surfaces of the mould 90 and 91. The mould side surfaces extend in a substantially vertical plane. In this example, the side surfaces of the mould are inclined relative to the vertical plane. The inclined surface 90 is formed such that there is an acute angle between the inclined surface 90 and the process flange 246. Similarly, the inclined surface 91 is formed such that there is an acute angle between the inclined surface 91 and the process flange 247. The insert 50 is fabricated with a strip 150 of GFRP which extends out from the insert leading edge flange 146, over the mould leading edge flange 46, inclined surface 90 and leading edge process flange 246. The strip 150 is held against the inclined surface 90 with a clamp 92 which is connected to the leading edge process flange 246.

On the trailing edge side, the insert 50 is fabricated with a strip 151 of GFRP which extends out from the insert trailing edge flange 147, over the mould trailing edge flange 47, inclined surface 91 and trailing edge process flange 247. The strip 151 is held against the inclined surface 91 with a clamp 92 which is connected to the trailing edge process flange 247.

By connecting the insert 50 at the process flanges 246, 247 the insert 50 is held more securely on the mould 40 than if it was just connected at the leading edge mould flange 46 and the trailing edge mould flange 47. This is because the insert 50, through the strips 150 and 151 can be clamped securely at these places. In addition, the inclined surfaces 90 and 91 provide a negative draft angle and therefore help to prevent the insert 50 from moving relative to the mould 40.

A vacuum seal (not shown) is provided between the strip 150 and the leading edge process flange 246 and between the strip 151 and the leading edge process flange 247. Vacuum seals are also provided at the proximal end and the distal end of the insert as described with reference to FIG. 10. Therefore, the insert 50 is held in place against the mould by a vacuum force and by the clamps 92.

The strips 150 and 151 are formed from GFRP and are typically just 0.5 millimetres thick. Thus they can be elastically deformed to fit around the negative draft angles of the inclined surfaces 90 and 91.

By "negative draft angle" is meant that the surfaces 90 and 91 are inclined relative to the mould flanges such that the insert 50 cannot be directly lifted off the mould 40 as the strips 150 and 151 will clash with the inclined surfaces. Instead, some force has to be applied to the strips 150, 151 in order to deform them and lift the insert from the mould.

The clamps 92 may also be in the form of bolts which connect the insert 50 to the process flanges 246, 247 of the mould 40. Using bolts is advantageous because holes in the insert 50 can be aligned with corresponding holes on the mould 40, so that the insert 50 is always located at the correct position when placed on the mould surface 143.

In the example shown in FIG. 13 the side surfaces of the mould 90, 91 both have a negative draft angle. However, in another example, only one of the side surfaces has a negative draft angle, and the other side surface has a zero draft or a positive draft angle. This arrangement will accommodate more variations in fit between the mould 40 and the insert 50. In a further example (not shown) there may be no draft angles and the insert 50 is primarily held to the mould via the vacuum, but there are also clamps (such as bolts) to hold the insert 50 in the event of a vacuum failure. These bolts may connect the insert 50 to the process flanges 246, 247 of the mould 40.

FIGS. 14a to 14e show further details of the tip end of the blade mould with the insert in place.

Figure 14A:
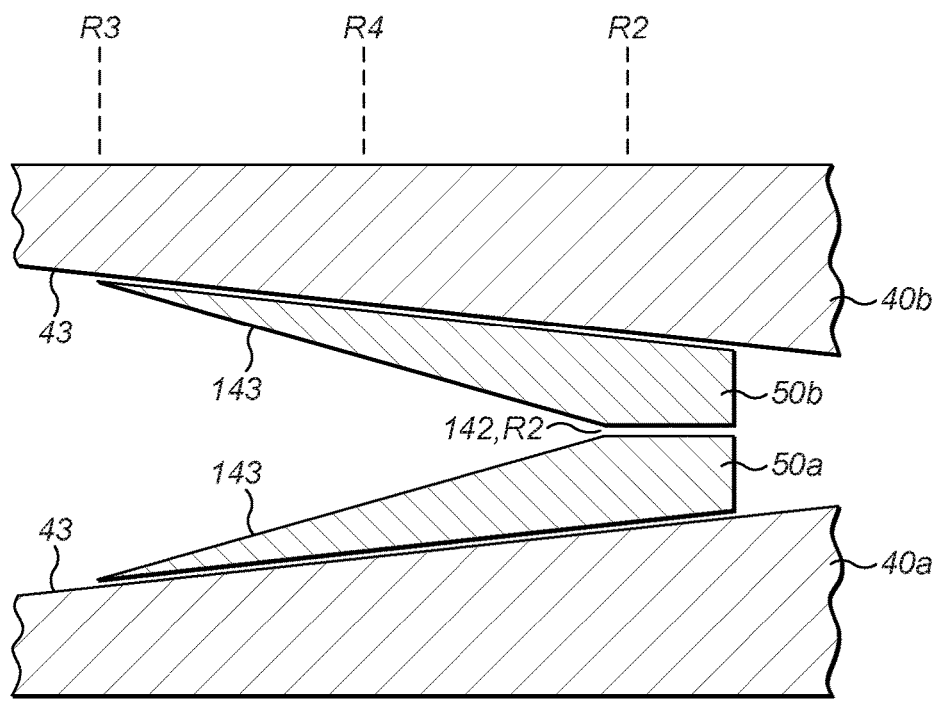
FIG. 14a is a cross section of the wind turbine rotor blade mould with an insert in two mould halves.

FIG. 14a shows a partial cross section of the mould 40. In contrast to FIGS. 11a to 11d, FIG. 14a shows both mould halves that are used to fabricate the complete blade, i.e. a lower mould half 40a and an upper mould half 40b when they are brought together to join the two shell halves that make the full blade. An insert 50a and 50b (collectively defined as 50) is associated with each mould half 40a, 40b, respectively. As previously discussed, the inserts 50 create a modified tip end 142 in the mould 40 such that the blade produced will have a tip end at a spanwise position R2, corresponding to a blade length of L2. The inserts 50 starts at the spanwise position R3, and between R2 and R3 a spanwise position R4 is defined.

Figure 14B:
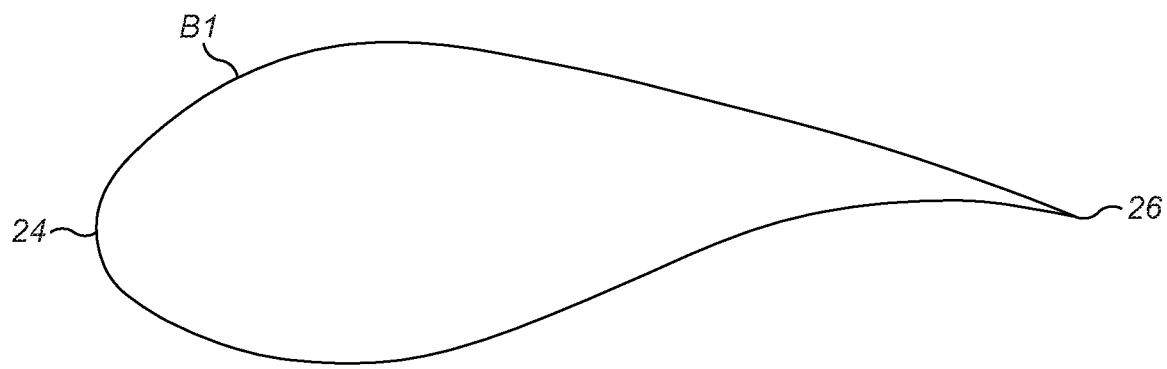
FIGS. 14b to 14e illustrate the geometry of blades produced in the mould.

FIG. 14b is a chordwise cross section of the first blade B1 produced on the mould surface 43 (that is the mould surface without the insert 50 in place) at position R4. The cross section has an airfoil shape that extends from a leading edge 24 to a trailing edge 26 as per the blade shown in FIG. 2.

Figure 14C:
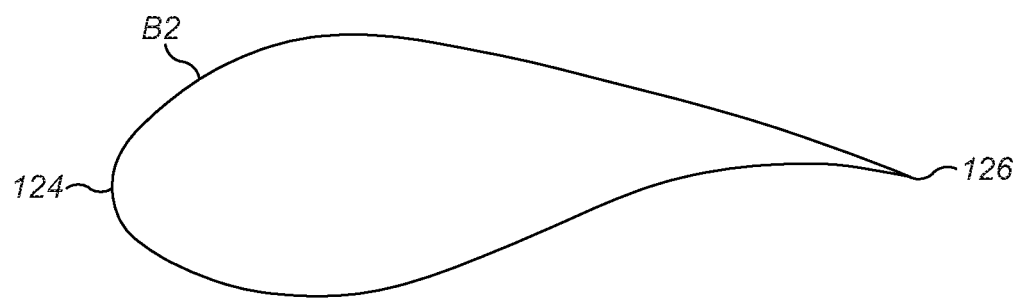

FIG. 14c is a chordwise cross section of the second blade B2 produced on the mould surface 143 (that is with the insert 50 in place on the mould surface 43) at position R4. The cross section has an airfoil shape that extends from a leading edge 124 to a trailing edge 126. As can be seen, the cross section of blade B2 is smaller than that of B1 due to the use of the insert 50.

Figure 14D:
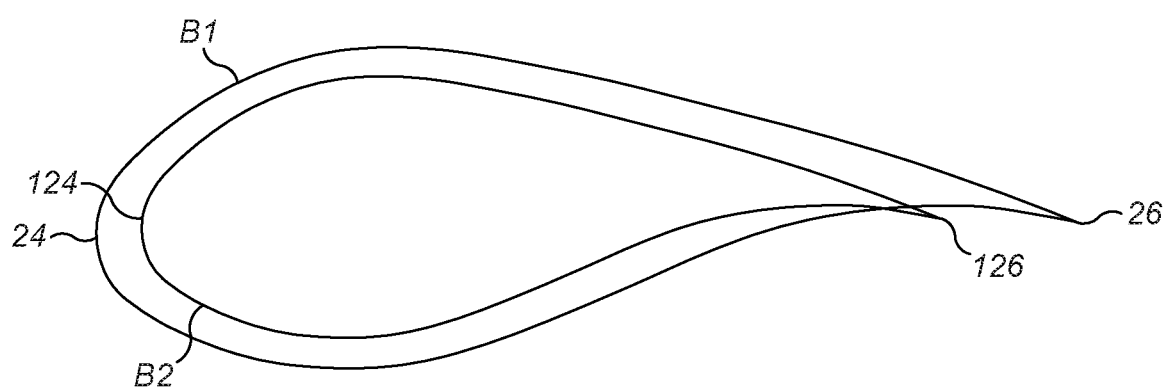

Next, referring to FIG. 14d, the chordwise cross sections of blades B1 and B2 have been superimposed on each other. As can be seen, without careful design of the insert 50, the trailing edge 126 of blade B2 will extend outside of the cross section of blade B1. The airfoil cross section of B1 and B2 has camber (i.e. it is not a symmetric airfoil) and it is this camber which causes the trailing edge 126 of blade B2 to extend outside the cross section of blade B1.

It is impossible to manufacture the blade B2 as shown in FIG. 14c because the trailing edge 126 as illustrated would extend into the mould surface 43 of the mould 40. Therefore, the insert 50 needs to be designed such that this does not happen. One way of solving this problem would be to reduce the camber of the second blade B2 such that the airfoil cross section of blade B2 always lies within the cross section of the blade B1. However, this could have a detrimental impact on the lift force generated at the tip of the second blade B2.

Figure 14E:
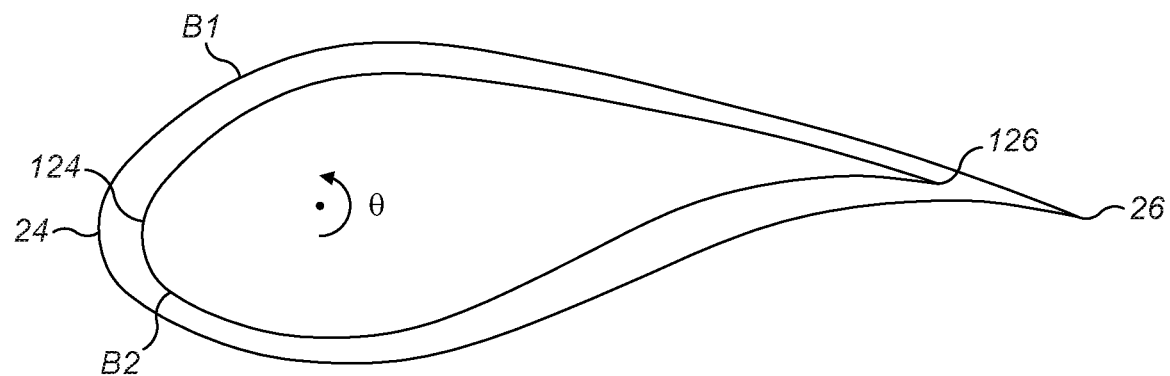

Therefore, to solve the problem, and as illustrated in FIG. 14e, the second blade B2 cross section has been twisted about an angle $\theta$ relative to the second blade B1. The twist angle $\theta$ (which is in the anti-clockwise direction when looking at FIG. 14e) puts the leading edge 124 down and the trailing edge 126 up of the second blade B2 relative to the first blade B1.

Figure 15:
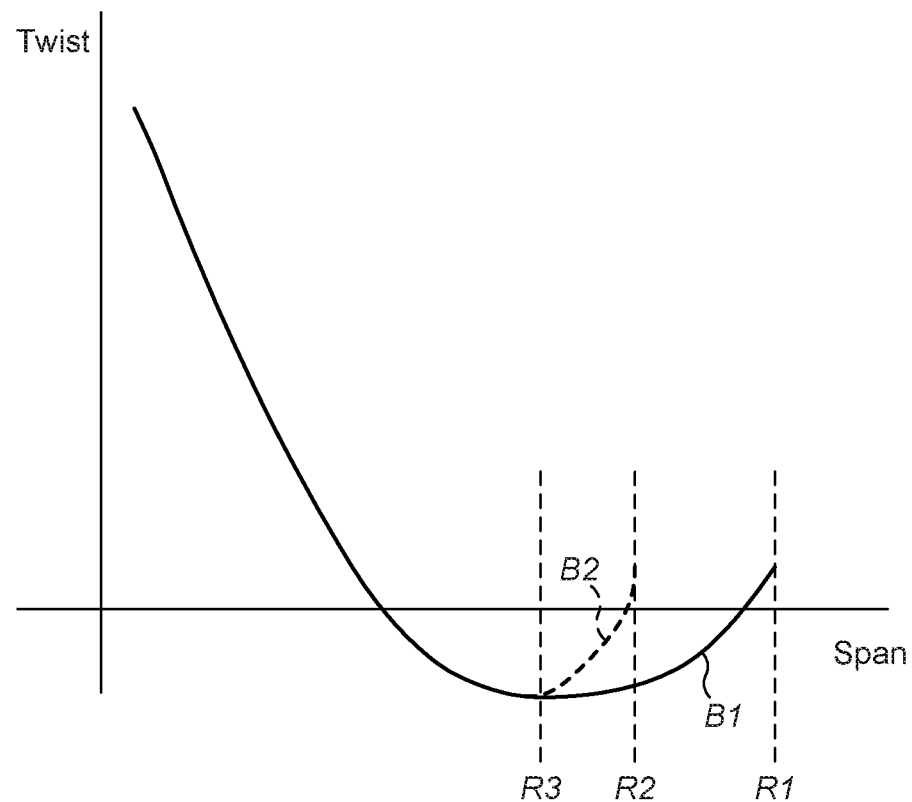
FIG. 15 is a graph showing the twist of blades produced in the mould.

FIG. 15 shows the twist of the blade along its span, moving from the root of the blade (at the left hand side of the abscissa) to the tip end of the blade (at the right hand side of the abscissa). The twist of the first blade B1 is shown by the solid line and the twist of the second blade B2 is shown by the dashed line.

As background, blade twist is necessary as the effective flow at the blade in use comprises the rotor rotational speed and the oncoming wind speed. As the peripheral speed of the blades increases along the blade span, the angle of attack of a blade section also varies along the blade span. To maintain the angle of attack and the lift force along the blade, the blade has a twist distribution from the root to the tip. The tip of the blade is also "de-twisted" in order to reduce the induced drag from the tip of the blades.

Blades B1 and B2 have the same twist distribution from the root of the blade until the spanwise position R3, which is where the insert 50 is positioned on the mould 40. Outboard of spanwise position R3, i.e. towards the tip of the blade, the second blade B2 has a different twist distribution to that of the first blade B1. In particular, the twist angle at the very tip of blades the B1 and B2 is the same value, but the second blade B2 is twisted more rapidly in order to reach this twist angle at the tip of the second blade B2. This twist distribution of the blade B2 avoids the situation illustrated in FIG. 14d.

Many alternatives to the examples described are possible and will occur to those skilled in the art without departing from the scope of the invention which is defined by the following claims.

For example, although the mould is described as forming one half of a wind turbine blade, the principle of providing one or more removable inserts is applicable to any suitable method of blade manufacture in a mould. For example, it is applicable to blades formed as a single piece within a single mould cavity, or to blades formed from any number of sub-components which are subsequently assembled. The blade layup 70 has been described above with reference to pre-impregnated material; however, dry glass fabric could be used instead and then infused with resin in a vacuum assisted resin transfer moulding (VARTM) process.

The invention claimed is:

1. A method of manufacturing a wind turbine blade body, the method comprising the steps of:
providing a mould having a mould surface for forming a first blade body having a first length, the mould having a mould root end and a mould tip end;
placing a removable insert on the mould surface towards the mould tip end to form a modified mould surface for forming a second blade body having a second length which is less than the first length,
wherein the insert extends between a proximal end facing toward the mould root end and a distal end facing toward the mould tip end, and wherein:
the mould tip end has a spanwise position R1;
the insert when located on the mould has an insert tip end at a spanwise position R2 and the proximal end is at spanwise position R3,
wherein a twist distribution of the modified mould surface of the insert between the positions R2 and R3 is different to the twist distribution of the mould surface of the mould between the positions R2 and R3; and
forming the second blade body on the modified mould surface.

2. The method according to claim 1, further comprising:
selecting the length of the second blade body based on the blade length required; and
selecting a removable insert which is sized to form a second blade body having the required length.

3. The method according to claim 1, wherein the blade body comprises a wind turbine blade shell or half shell and extends from a root end to a tip end.

4. The method according to claim 1, wherein a gap is provided between the insert and the mould surface.

5. The method according to claim 1, wherein a vacuum is applied between the insert and the mould to retain the insert in position on the mould surface.

6. The method according to claim 5, wherein the vacuum is applied to the gap between the insert and the mould surface.

7. The method according to claim 1, wherein the insert extends over a side surface of the mould and is clamped to the mould.

8. The method according to claim 7, wherein the side surface of the mould has a negative draft angle.

9. The method according to claim 1, wherein the step of placing the insert on the mould surface comprises locating the distal end of the insert at a distance from the mould tip end.

10. An apparatus for manufacturing a wind turbine blade body comprising:
a mould having a mould surface for forming a first blade body having a first length, the mould having a mould root end and a mould tip end;
a removable insert arranged to be placed on the mould surface towards the mould tip end to form a modified mould surface for forming a second blade body having a second length which is less than the first length,
wherein the insert extends between a proximal end facing toward the mould root end and a distal end facing toward the mould tip end, and wherein:
the mould tip end has a spanwise position R1;
the insert when located on the mould has an insert tip end at a spanwise position R2 and the proximal end is at a spanwise position R3,
wherein a twist distribution of the modified mould surface of the insert between the positions R2 and R3 is different to the twist distribution of the mould surface of the mould between the positions R2 and R3.

11. The apparatus according to claim 10, wherein there is a gap between the insert and the mould surface.

12. The apparatus according to claim 10, further comprising a vacuum system to retain the insert in position on the mould surface.

13. The apparatus according to claim 10, wherein the insert extends over a side surface of the mould and is clamped to the mould.

14. The apparatus according to claim 10, wherein the side surface of the mould has a negative draft angle.

15. The apparatus according claim 14, wherein the insert is arranged on the mould surface such that the distal end of the insert is at a distance from the mould tip end.

16. The apparatus according to claim 10, wherein the insert is formed with a rib structure.

* * * * *